United States Patent
Heath et al.

[19]

[11] Patent Number: 5,845,965
[45] Date of Patent: Dec. 8, 1998

[54] ADJUSTABLE ARMREST FOR AUTOMOBILE CONSOLE

[75] Inventors: Gerald Arthur Heath, Canton; Ionel Eugene Simplicean, Dearborn Hgts.; Sorin Stancu, Detroit, all of Mich.

[73] Assignee: Ford Motor Company, Dearborn, Mich.

[21] Appl. No.: 784,702

[22] Filed: Jan. 16, 1997

[51] Int. Cl.⁶ .................................................... A47C 7/62
[52] U.S. Cl. .............................. 297/188.19; 297/411.35; 297/188.14
[58] Field of Search ................... 297/188.19, 188.14, 297/411.35

[56] References Cited

U.S. PATENT DOCUMENTS

| | | | |
|---|---|---|---|
| 2,494,838 | 1/1950 | Slaughter | 297/188.19 X |
| 2,692,638 | 10/1954 | Castell | 297/188.19 X |
| 2,726,710 | 12/1955 | Cutler | 297/188.19 X |
| 2,736,320 | 2/1956 | Roberts | 297/188.19 X |
| 2,797,739 | 7/1957 | Orsini | 297/188.19 X |
| 3,025,108 | 3/1962 | Teague, Jr. | 297/411.35 X |
| 4,822,103 | 4/1989 | Stenvall | 297/411.35 |
| 5,076,641 | 12/1991 | Lindberg | 297/188.19 X |
| 5,116,099 | 5/1992 | Kwasnik et al. | 297/188.19 X |
| 5,131,716 | 7/1992 | Kwasnik et al. | |
| 5,207,477 | 5/1993 | Maxwell | 297/188.19 X |
| 5,222,780 | 6/1993 | Reh et al. | 297/188.19 |
| 5,439,268 | 8/1995 | Dorzsa-Farkas | 297/411.35 |

FOREIGN PATENT DOCUMENTS

| | | | |
|---|---|---|---|
| 1317274 | 1/1963 | France | 297/411.35 |
| 443145 | 2/1936 | United Kingdom | 297/188.19 |

*Primary Examiner*—Peter R. Brown
*Assistant Examiner*—David E. Allred
*Attorney, Agent, or Firm*—David B. Kelley

[57] ABSTRACT

A console assembly in an automotive vehicle has a center console positioned between a pair of seats, a storage bin having a storage compartment therein accessible through an opening in an upper portion, and a lid covering the opening which is movable to provide an adjustable armrest. A hinge attached between the lid and the storage compartment allows the lid to pivot between a closed position covering the opening and an open position uncovering the opening. The hinge has a lid plate which fits into a sleeve on a bottom surface of the lid for allowing the lid to move longitudinally with respect to the console over the storage compartment between an aft position in which the lid covers the opening and a fore position in which a rear portion of the opening is uncovered. A cover plate covers the rear portion of the opening when the lid is in the closed and fore positions. The center console has a storage well for receiving the storage bin, which is movable between a seated position within the storage well and an extended position extended out of the storage well. In the extended position, a predetermined portion of the storage bin remains in the storage well to provide lateral stability of the a storage bin.

3 Claims, 5 Drawing Sheets

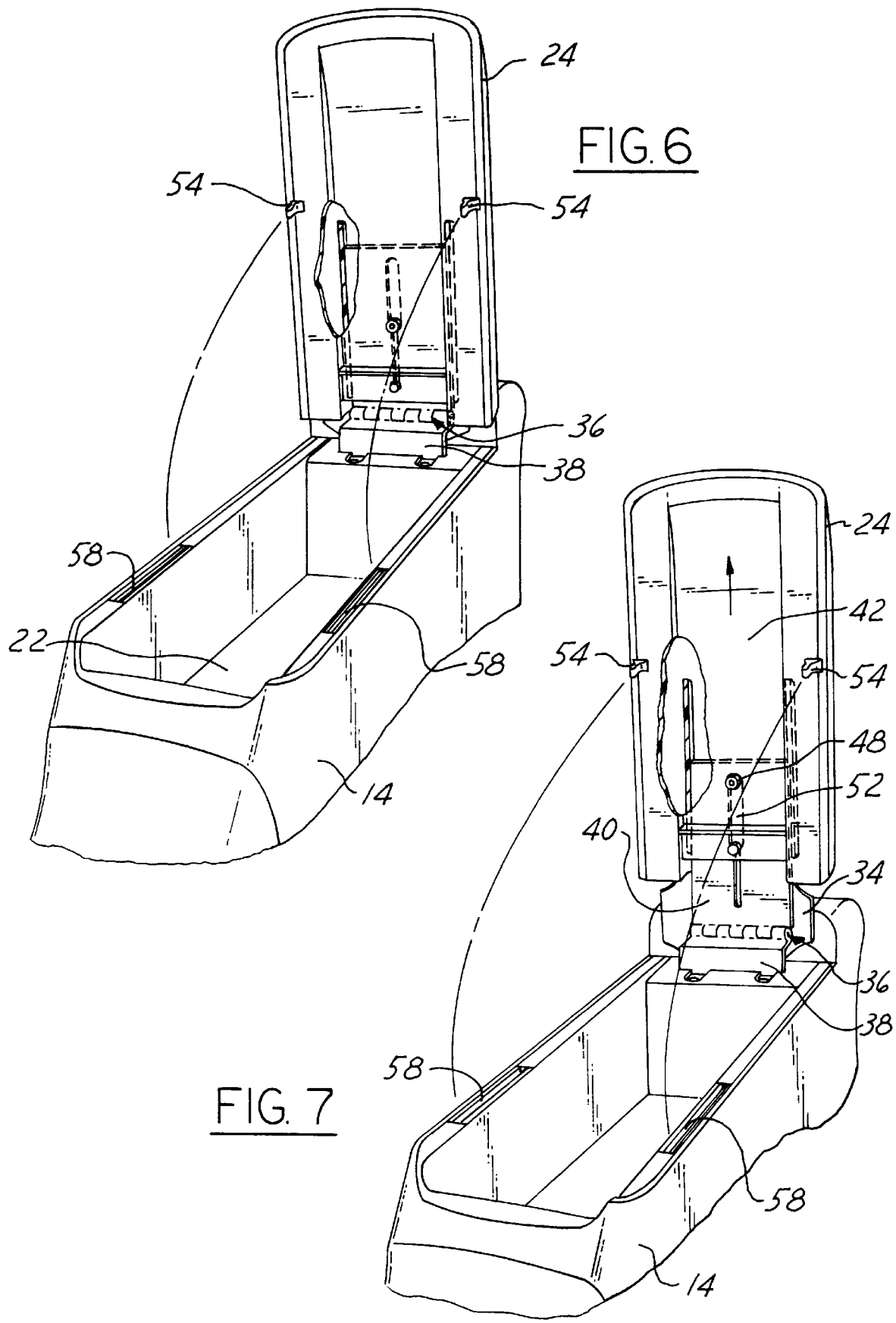

ADJUSTABLE ARMREST FOR AUTOMOBILE CONSOLE

FIELD OF THE INVENTION

The present invention relates to automotive vehicle consoles in general, and more specifically to a console assembly with a diagonally adjustable armrest.

BACKGROUND OF THE INVENTION

One task of automotive interior designers is to provide vehicle drivers and passengers with an ergonomically desirable environment. This task includes considering interior seating comfort. A feature important to seat comfort is armrest position. This is so since vehicle occupants vary substantially in height, girth, and arm length, as well as armrest position preference.

Various attempts have been made to accommodate the armrest needs of occupants in automotive vehicles having a center console, typically mounted between front seats. In U.S. Pat. No. 3,356,409 (Belsky), assigned to the assignee of the present invention, ball bearings 16 are employed to slide a console body 27 having a flat upper surface relative to a tunnel 14 upon which it is situated. Radial adjustment of an armrest assembly 22 is accomplished by locating a pawl 40 in one of a plurality of teeth 48 as disclosed in U.S. Pat. No. 4,674,790 (Johnson).

It is known to permit longitudinal displacement of an armrest, between seats or next to a seat, to accommodate different sized occupants and arm sizes. For example, as seen in U.S. Pat. No. 4,674,798 (Oeth et al.), adjustable arm rests are fixed longitudinally by a rotatable latch mechanism 44 which is carried by the arm rests and moved against a support 26 for the arm rests. Offner, in U.S. Pat. No. 3,140,119, illustrates the employment of spring loaded ball 27 to longitudinally fix arm rests 17. In U.S. Pat. No. 5,112,094 (Kribs), a console mounted armrest 10 is horizontally adjustable by a tongue 17 and apertures formed in a base 11 and the tongue.

In another mechanism, as seen in U.S. Pat. No. 4,934,750 (Eichler et al.), arm rest 8 is longitudinally slidable on a housing 7 by rollers 17. The housing 7 is mounted on the top of a storage compartment 6 located on a center console 2. The housing and arm rest are pivoted and mounted to the storage compartment 6. The arm rest is longitudinally positioned by lever 23, detent 19, and an apertured rail 18. This mechanism has many parts and is expensive to manufacture and install. In addition, the rails do not provide for rotation of a cover between an open and closed position.

The aforementioned armrests, however, do not provide the versatility required to meet the ergonomic needs of automotive vehicle occupants while simultaneously providing the functionality required to cover a storage compartment in the console, or situated nearby, when the armrest is in various positions. Thus, an adjustable armrest is needed which allows a wide range of positions in both the vertical and horizontal directions.

SUMMARY OF THE INVENTION

The present invention overcomes the deficiencies of the related art by providing a console assembly with an adjustable armrest in an automotive vehicle. The assembly has a center console positioned between a pair of seats in the vehicle with a storage well therein defined by a storage well bottom and at least one storage well side. A storage bin is mounted within the storage well for movement between a seated position in which a storage bin bottom abuts the storage well bottom and an extended position in which a predetermined portion of a storage bin wall abuts the at least one storage well side, the storage bin having a storage compartment therein accessible by an opening in an upper portion thereof. Storage bin adjustment means provide movement of the storage bin between the seated position and the extended position. A lid covers the opening in the storage bin and has an outer surface for receiving an arm of a vehicle occupant thereon. Hinge means attached to the lid and the storage compartment allow the lid to pivot between a closed position covering the opening and an open position uncovering the opening. Slide means on the hinge means and the lid allow the lid to move longitudinally with respect to the console over the storage compartment between an aft position in which the lid covers the opening and a fore position in which a rear portion of the opening is uncovered. A plate, which is preferably part of the hinge means, covers the rear portion of the opening when the lid is in the closed and fore positions.

An advantage of the present invention is a console assembly which provides horizontal adjustment of an armrest surface in addition to vertical adjustability.

Another advantage of the present invention is a console assembly with a lid adjustable as an armrest which easily slides out of the way of a manual handbrake.

A feature of the present invention is a lid mounted over a storage compartment in a console which is pivoted along a rear edge for covering and uncovering a storage compartment opening, the lid slidable along a cover plate of the hinge between fore and aft positions to provide a horizontally adjustable armrest.

Another feature is a storage well in the console for receiving a storage bin, the storage bin movable between a seated position in the storage well and an extended position extended a predetermined distance above the well floor so that a predetermined portion of the storage bin remains in the storage well to provide lateral stability of the storage bin.

Yet another feature is a storage bin which is vertically adjustable out of the storage well by a telescoping member mounted in the console and attached to the storage bin.

BRIEF DESCRIPTION OF THE DRAWINGS

These and other objects, advantages, and features of the present invention will become apparent upon reading the following description with reference to the accompanying drawings, in which:

FIG. 6 is a front perspective view of a console assembly according to the present invention shown with the lid in the open position uncovering the storage compartment, the lid also being in the aft position;

FIG. 7 is a front perspective view similar to FIG. 6 showing the lid in a fore position;

DETAILED DESCRIPTION OF THE PREFER EMBODIMENT

Figure 1:
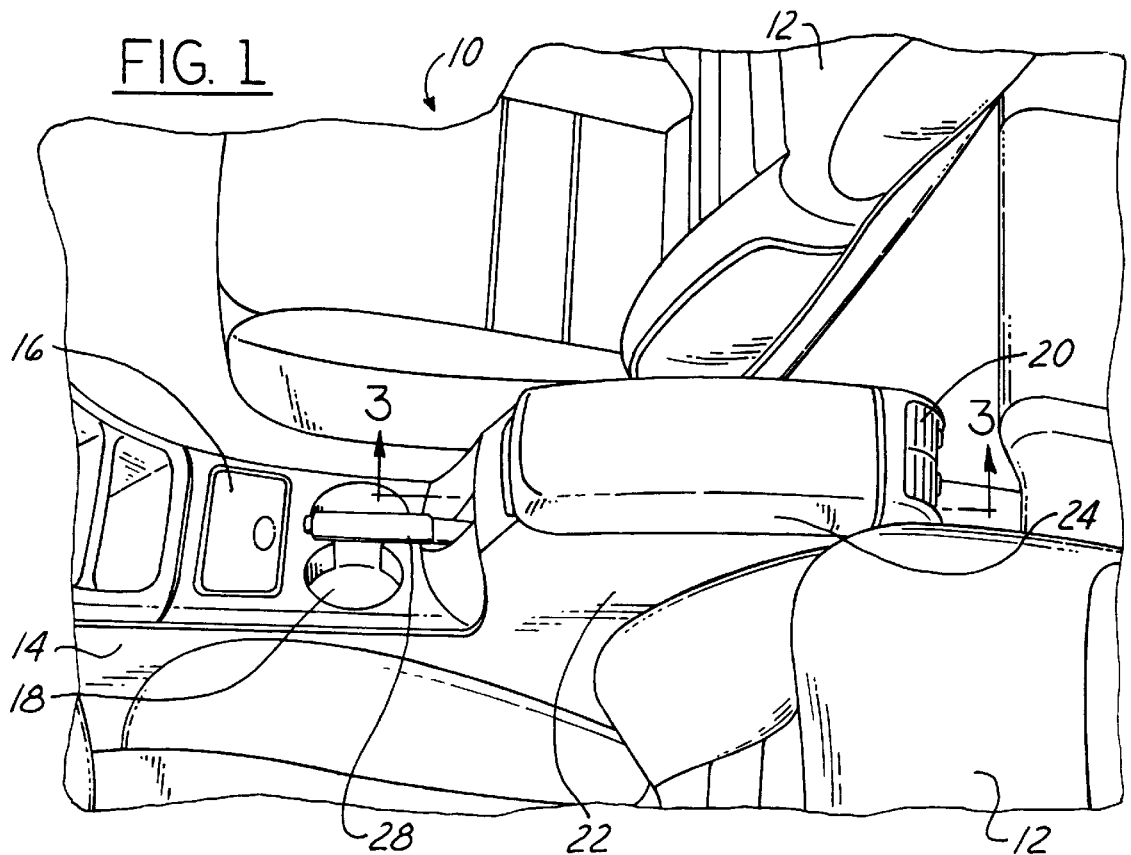
FIG. 1 is a perspective view of an automobile vehicle interior having a center console with an adjustable armrest in an aft position according to an embodiment of the present invention.
Figure 2:
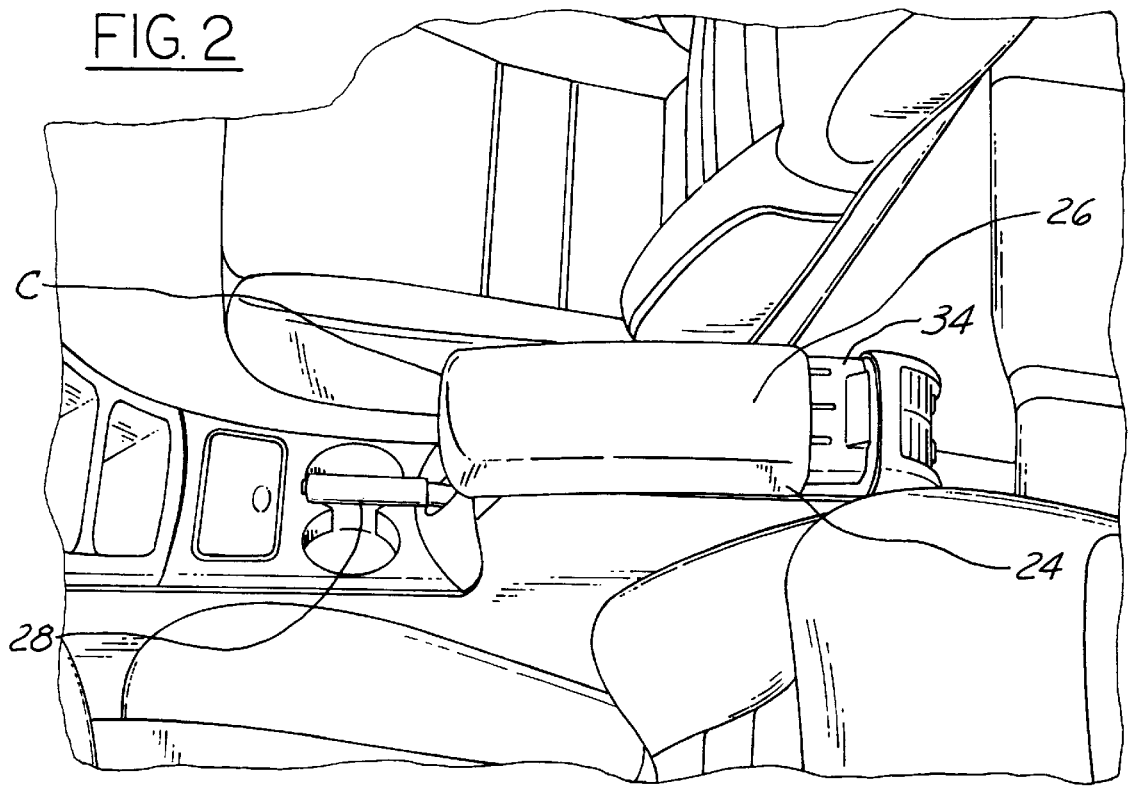
FIG. 2 is a perspective view similar to FIG. 1 but showing the adjustable armrest moved forward into a fore position.

Turning now to the drawings, and in particular to FIG. 1, an interior 10 of an automotive vehicle is shown having a pair of seats 12 with a console assembly 14 situated therebetween. As known to those skilled in the art, various accouterments may be included as part of the console assembly 14. Such accouterments may include an ashtray 16, cupholder 18, and climate control vent 20. A storage compartment 22 of the console 14 has a lid 24 thereon which, as further described below, is moveable to cover and uncover the storage compartment 22. The lid 24 is also moveable in a fore-aft direction between an aft position (FIG. 1) and a fore position (FIG. 2). An upper surface 26 of the lid 24 serves an armrest for an arm of a vehicle occupant. The console 14 may also have a hand-operated parking brake handle 28 extending thereoutof which may collide with the lid 24 when in the fore position. An advantage of the present invention is that the lid 24 may slide backwardly toward the aft position without damage to the console 14 should such a collision occur.

Figure 3:
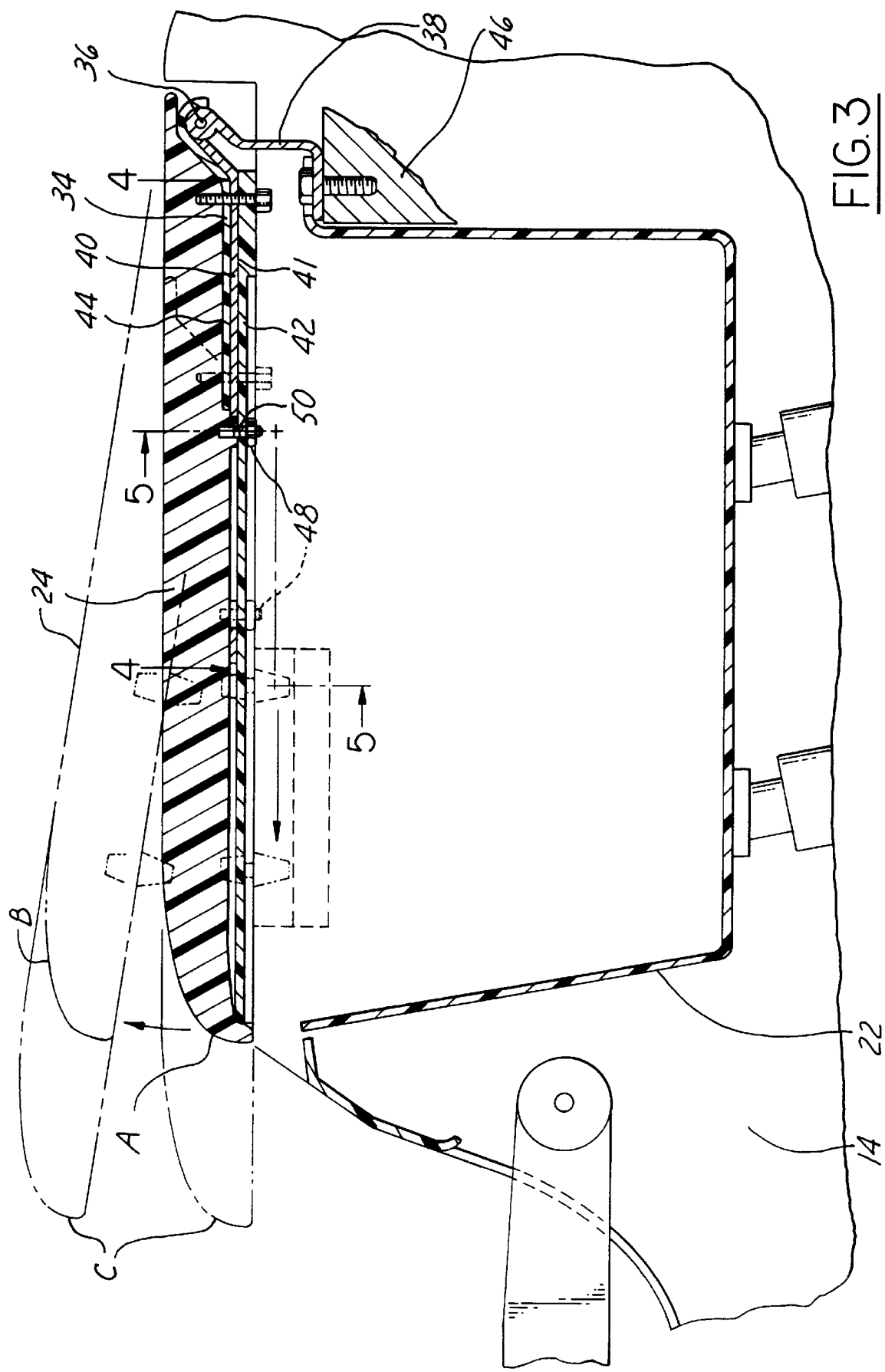
FIG. 3 is a cross-sectional view taken along line 3—3 of FIG. 1 showing a storage compartment with a lid, which also serves as an armrest, movable to cover and uncover the storage compartment as well as slide in the fore-aft direction.
Figure 8:
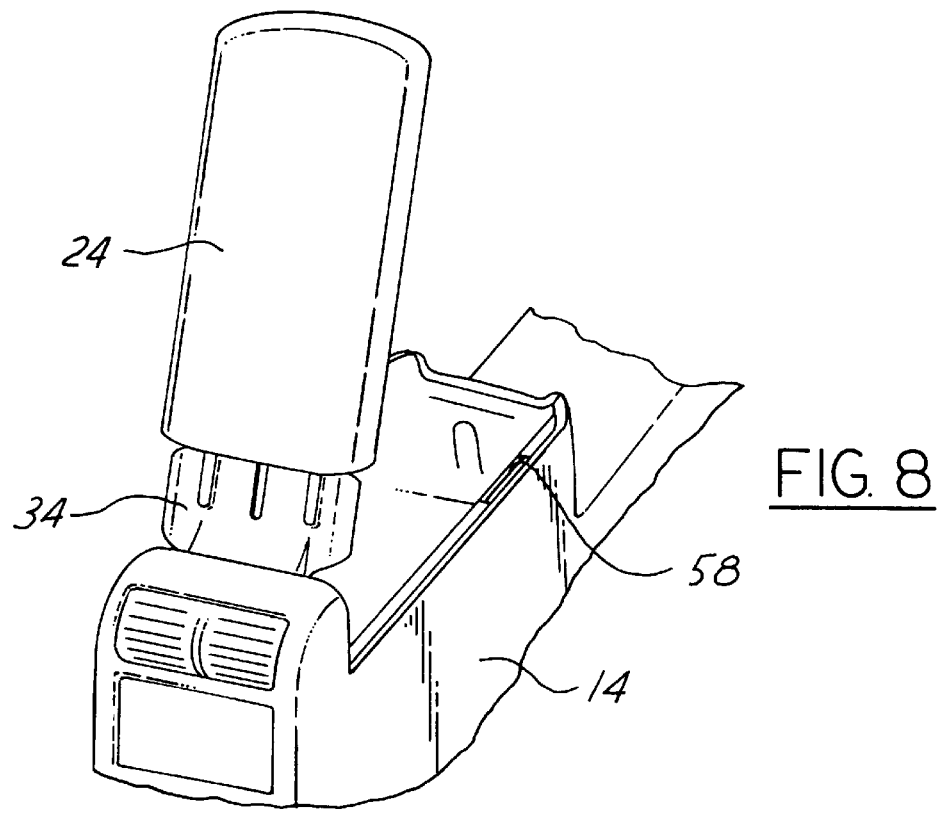
FIG. 8 is a rear view of the console assembly shown in FIG. 7.

Referring to FIG. 3, a cross-sectional view through the lid 24 and the storage compartment 22 of the console 14 is shown. The lid 24 is moveable between a closed position A covering an opening 30 in an upper portion of the console 14, and an open position B uncovering the opening 30. In either the closed position A or the open position B, the lid 24 is moveable to the fore position, identified as position C (shown in phantom lines). When in the fore position C, a rear portion 32 of the opening 30 is covered by a cover plate 34 (FIGS. 2 and 8). The lid 24 pivots between the closed position A and the open position B about a hinge 36 which has a console plate 38 attached to the console 14 and a lid plate 40 which preferably is friction-fit to a sleeve 41 for slidable movement relative thereto. The sleeve 41 is formed between a sleeve plate 42 spanning and abutting upper edges of the opening 30 below and a bottom surface 44 of the lid 24 above. The hinge 36 is preferably mounted at a rear section 46 at an upper rear section of the console 14 proximate the storage compartment 22 so that the lid 24 pivots upwardly between the closed position A and the open position B to allow access through the opening 30 from an area forward of the storage compartment 22. For purposes of FIG. 3, the forward direction is to the left.

Figure 4:
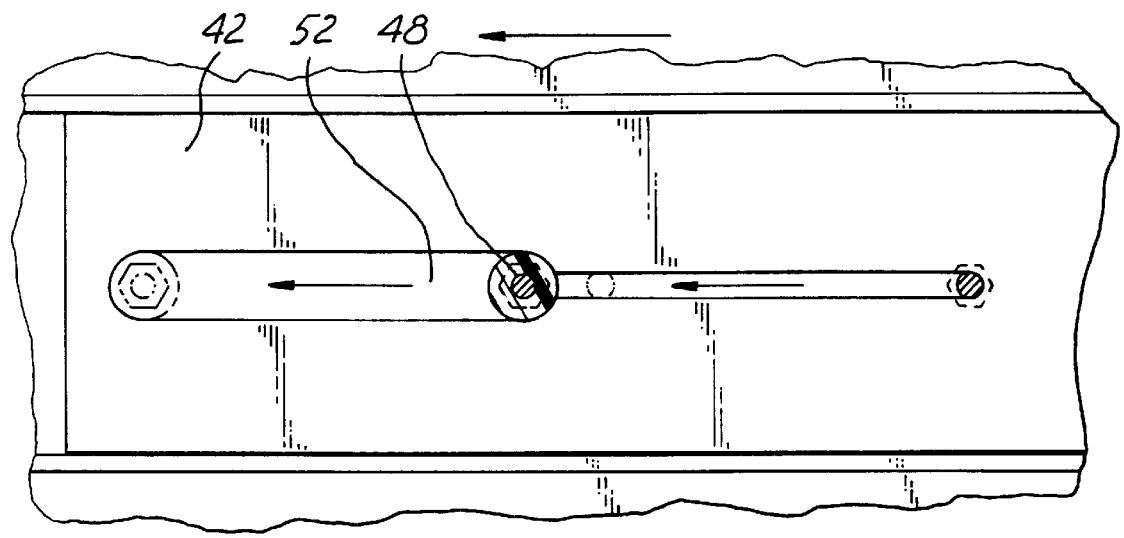
FIG. 4 is a sectional view taken along line 4—4 of FIG. 3.
Figure 5:
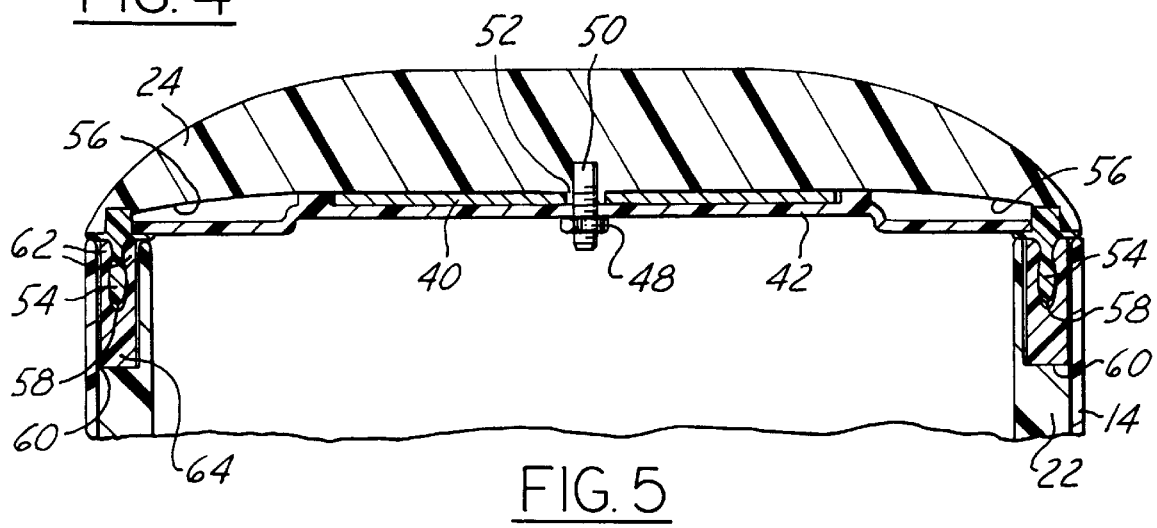
FIG. 5 is a sectional view taken along line 4—4 of FIG. 3.

To provide increased stability of the lid 24 when sliding relative to the lid plate 40, a guide nut 48 is attached to a guide bolt 50 on the bottom surface 44 of the lid 24 (FIGS. 4 and 5). The guide nut 48 and guide bolt 50 slide within a slot 52 in the sleeve 42.

As seen in FIGS. 5–7, the lid 24 preferably has a pair of clips 54 descending from opposite underside edges 56 for interaction with clip slots 58 on upper edges 60 of the storage compartment 22. When in the closed position A (FIG. 5), the lid 24 can be adjusted between the fore and aft positions by the clips slot 58. Each clip 54 is preferably bead shaped so as to fit between opposing prongs 62 of a clip slide 64 which defines the clip slot 58. The prongs 62 are parted by the bead portion of the clip 54 when the lid 24 is moved between the closed position A and the open position B, and vice versa. The prongs 62 are preferably made of a metal which can spring to allow the clip 54 to part them.

Figure 9:
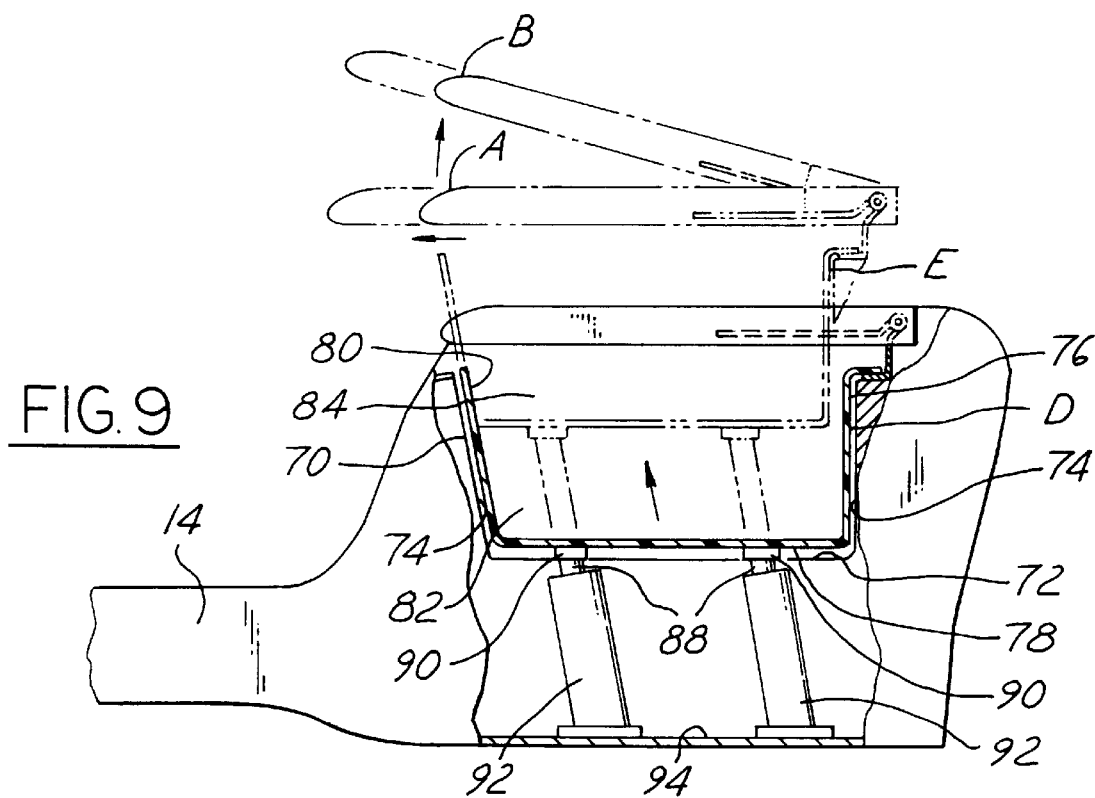
FIG. 9 is a side of a center console according to an embodiment of the present invention showing a storage compartment movable between a seated position in a well in the console and an extended position extending a predetermined distance out of the well.

In another embodiment of the present invention, as seen in FIG. 9, the center console 14 has a storage well 70 therein defined by a storage well bottom 72 and sides 74. Mounted within the storage well 70 is a storage bin 76 which moves between a seated position D in which a storage bin bottom 78 abuts the storage well bottom 72 and an extended position E in which a portion of a storage bin wall 80 abuts the sides 74 of the storage well 70. The storage bin 70 has a storage compartment 82 therein which is accessible through an opening 84 in an upper portion thereof. To provide the vertical adjustment of the storage bin 70 between the seated position B and the extended position E, a pair of telescoping members 88 are mounted between the storage bin 70 and the console 14. The telescoping members have a first end 90 mounted to the storage bin bottom 78, and have a second end (not shown) which is positioned for slidable movement within a telescoping sleeve 92. The telescoping sleeves 92 are mounted to a bottom 94 of the console 14.

The storage bin 70 may alternatively be moved between the seated position D and the extended position E by a single telescoping member, as opposed to two telescoping members, as shown in FIG. 9. If a single telescoping member is used to provide vertical adjustment of the storage bin 70, a stabilizing rod may be utilized to provide additional stability and to prevent the storage bin from rocking about the telescoping member.

It is important to recognize that in the extended position E, the storage bin 70 has portion of its sides 80 in contact with the storage well walls 74 to provide stability. That is, the storage bin 76 is preferably not extended completely out of the storage well 70. Such an arrangement, in addition to having two telescoping members 88, provides sufficient stability for the storage bin 76 when in the extended position E.

The telescoping member 88 is preferably pneumatically or hydraulically operated in a fashion known to those skilled in the art and suggested by this disclosure. The telescoping member 88 can also be mechanically operated. A catch member (not shown) on the telescoping member 88 interacts with incremental openings or slots (not shown) in the members 92 to allow the telescoping member to be temporarily adjusted to various positions. Alternatively, the telescoping member 88 may have a series of openings therein which receive a catch member (not shown) on the member 92.

With a console assembly 14 according to the present invention, an armrest, which is the upper surface 26 of the lid 24, can be adjusted both in a vertical direction and in an fore-aft direction. Since occupants that sit closer to a forward edge of a seat tend to sit higher in the automobile interior, the telescoping members 88 preferably are mounted so that the seated position D of the storage bin is longitudinally aft relative to the extended position E. Thus, the armrest surface 26 is positioned at a vertically higher and longitudinally forward position when in the extended position E than when the storage bin is in the seated position B. Thus, the telescoping member 88 is mounted so as to be angled with respect to a vertical axis for simultaneously adjusting the storage bin 76 in both a vertical direction and in a fore-aft direction with respect to the console 14.

Although the preferred embodiment of the present invention has been disclosed, various changes and modifications may be made without departing from the scope of the invention as set forth in the appended claims.

We claim:

1. A console assembly providing an adjustable armrest in an automotive vehicle, the assembly comprising:

a center console positioned between a pair of seats in the vehicle and having a storage compartment therein, the storage compartment accessible by an opening in an upper portion of the console;

a lid for covering the opening in the storage compartment, the lid having an outer surface for receiving an arm of a vehicle occupant thereon;

hinge means for allowing the lid to pivot between a closed position covering the opening and an open position uncovering the opening, the hinge means mounted to a rear portion of the console and a rear end of the lid having a side-to-side axis so that the lid pivots upwardly about a rear end of the console between the closed position and the open position, the hinge means comprising a console plate attached to the console and a lid plate attached to the lid;

slide means for allowing the lid to move longitudinally with respect to the console over the storage compartment between an aft position in which the lid covers the opening and a fore position in which a rear portion of the opening is uncovered;

a cover plate for covering the rear portion of the opening when the lid is in the fore position; and wherein the slide means comprises a sleeve, formed by a sleeve plate below and a bottom surface of the lid above, said sleeve receiving portions of the cover plate and the lid plate by friction fit for slidable movement relative thereto.

2. A console assembly according to claim 1 wherein the lid has at least one clip on an underside edge thereof for interaction with a clip slot on an upper edge of the console so that the lid is adjustable between the fore and aft positions when in the closed position.

3. A lid assembly on a center console adapted to be positioned between a pair of seats in an automotive vehicle, said console having a storage compartment, said storage compartment having an upwardly directed opening in an upper portion of the console, said opening of storage compartment overlaid with a lid providing an adjustable armrest, the assembly comprising:

said lid mounted to the rear of the storage compartment, the lid pivoted by a single system hinge means having a side-to-side axis to allow vertical displacement of the lid between a closed position covering the opening and an open position uncovering the opening; and the lid further sliding longitudinally with respect to the console over the storage compartment between an aft position in which the lid covers the opening and a fore position in which a rear portion of the opening is uncovered;

lid slide means comprising a sleeve, formed by a sleeve plate below and a bottom surface of the lid above, and having a slot receiving a guide bolt having a guide nut thereon and attached to said bottom surface of the lid, said guide bolt and guide nut slidably disposed within the slot for movement along the sleeve for providing stability to the lid during slideable movement.

* * * * *